United States Patent
Hayakawa et al.

(10) Patent No.: US 7,796,203 B2
(45) Date of Patent: Sep. 14, 2010

(54) LIQUID CRYSTAL DISPLAY DEVICE

(75) Inventors: Kazunori Hayakawa, Hakusan (JP); Koji Nakayama, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 207 days.

(21) Appl. No.: 12/027,684

(22) Filed: Feb. 7, 2008

(65) Prior Publication Data
US 2008/0192162 A1     Aug. 14, 2008

(30) Foreign Application Priority Data
Feb. 8, 2007     (JP) .............................. 2007-029688

(51) Int. Cl.
*G02F 1/1368* (2006.01)
(52) U.S. Cl. ........................ 349/42; 349/40; 324/770
(58) Field of Classification Search ................. None
See application file for complete search history.

(56) References Cited

U.S. PATENT DOCUMENTS 5,828,428 A * 10/1998 Kim et al. .................... 349/40
2004/0017531 A1 * 1/2004 Nagata et al. ............... 349/139
2004/0222815 A1 * 11/2004 Kim et al. .................... 324/770
2005/0140836 A1 * 6/2005 Choi ........................... 349/40

FOREIGN PATENT DOCUMENTS

| JP | 2000-155302 | | 6/2000 |
| JP | 2003-228298 | | 8/2003 |
| JP | 2004-272028 A | * | 9/2004 |

* cited by examiner

*Primary Examiner*—Mike Stahl
(74) *Attorney, Agent, or Firm*—Oblon, Spivak, McClelland, Maier & Neustadt, L.L.P.

(57) ABSTRACT

A liquid crystal display device including gate wiring parts for supplying a scanning signal to switching elements formed in a matrix form in a display area, and source wiring parts for supplying a video signal to the switching elements, the liquid crystal display device having a plurality of inspection switching elements arranged in an area outside the display area, and connected to the gate wiring parts or the source wiring parts and a wiring part for electrically and mutually connecting source electrodes of the inspection switching elements by high resistance elements.

4 Claims, 4 Drawing Sheets

LIQUID CRYSTAL DISPLAY DEVICE

BACKGROUND OF THE INVENTION

1. Field of the Invention

The present invention relates to an active matrix type liquid crystal display device.

2. Related Art of the Invention

At present, simultaneous lighting image inspection of a liquid crystal display panel is performed in a cell process in order to improve the production efficiency and to reduce the production cost in the liquid crystal display device. The simultaneous lighting image inspection refers to simple image inspection to check the presence or absence of a luminescent spot or a line defect by such a way that, for example, when an entire screen is displayed, all pixels are simultaneously lighted by simultaneously connecting source wiring parts and gate wiring parts to common inspection switching elements, respectively, and by applying a same signal to the source wiring parts and the gate wiring parts.

The plurality of inspection switching elements used for the simultaneous lighting image inspection are formed beforehand as inspection thin-film transistors (hereinafter refer to as inspection TFTs), for example, in an array process of the liquid crystal display device. The inspection TFT is formed in a place where a drive IC of the liquid crystal display device is provided. The inspection TFT is formed between an inspection signal input pad and the source wiring part or the gate wiring part. Further, the inspection TFT controls switching elements in the pixels of a display area in a lump by applying an inspection signal input into the inspection signal input pad to the source wiring parts or the gate wiring parts (for example, see Japanese Patent Laid-Open No. 2000-155302).

The entire disclosure of Japanese Patent Laid-Open No. 2000-155302 is incorporated herein by reference in its entirety.

The operation of the inspection TFT will be described in detail with reference to FIG. 4.

FIG. 4 is a figure schematically showing a configuration of a part of a conventional color liquid crystal display device. The liquid crystal display device shown in FIG. 4 includes inspection TFTs 22 and 23, inspection signal input pads 24 to 26, and pixels 27 on an array substrate 21. The pixels 27 are arranged in a display area 30, and the other components are arranged in the area outside the display area. Note that in the liquid crystal display device shown in FIG. 4, common electrodes and common electrode inspection wiring part connected to the common electrodes are not shown.

In the following, a case of simultaneously lighting red pixels will be described as an example.

First, a control signal for turning on/off the inspection TFTs 22 and 23 is input into the inspection signal input pad 26. The control signal is applied to each gate of the inspection TFTs 22 and 23 via a common wiring part 35. Thereby, the inspection TFT 22 and 23 are made to turn on. Next, an inspection gate signal is input into an inspection signal input pad 25. Thereby, the inspection gate signal is applied to gate wiring parts 11a and 11b.

Subsequently, an inspection source signal is input into the inspection signal input pad 24r. The control signal is already applied to the gate of the inspection TFT 22r, and hence the inspection TFT 22r is turned on. For this reason, the inspection source signal input into the inspection signal input pad 24r is applied to source wiring parts 12a and 12b. Thereby, all the red pixels 27r in the display area 30 are simultaneously lighted. Thus, disconnection of the source wiring part and the gate wiring part, breakdown of the switching element of the red pixels 27r, or the like, is recognized as a line defect or a luminescent spot, if present.

Similarly, when an inspection source signal is input into the inspection signal input pad 24g, it is possible to simultaneously light all of the green pixels 27g in the display area 30. Further, when an inspection source signal is input into the inspection signal input pad 24b, it is possible to simultaneously light the blue pixels 27b in the display area.

In this way, since a defective element can be detected by performing the simultaneous lighting image inspection in the cell process before expensive IC elements and the like are mounted, it is possible to improve the production efficiency and to reduce the production cost in the liquid crystal display device as a whole. Note that the simultaneous lighting image inspection method described with reference to FIG. 4 is an example. As another simultaneous lighting image inspection method, the inspection may also be performed in such a manner that the display area is divided into a plurality of areas, and the respective areas are simultaneously lighted. Further, all the pixels in the display area may also be simultaneously lighted.

However, in the manufacturing process of the liquid crystal display device, static electricity may be generated due to peeling charge, surge voltage, or the like. The inspection TFT is also capable of functioning as a capacitor having a capacitance larger than that of the switching element of the pixel in the display area, and hence easily accumulates static electricity. The static electricity accumulated in the inspection TFT becomes a cause of destruction of the inspection TFT, disconnection of wiring parts around the inspection TFT or the like.

In the conventional liquid crystal display device, there is taken a measure for preventing the switching element formed in the pixel inside the display area from being destroyed by the static electricity. However, the inspection TFT formed outside the display area is formed in a position away from the display area, and hence cannot receive the benefit of the measure against static electricity in the display area. Further, there is a problem that when destruction of the inspection TFT, disconnection of the wiring parts around the inspection TFT or the like is caused by the static electricity, it becomes impossible to perform the simultaneous lighting image inspection.

The present invention has been made in consideration of the above described problem, and an object of the invention is to provide a liquid crystal display device capable of reducing destruction of inspection switching elements or disconnection of wiring parts connected to the inspection switching elements, due to static electricity, as compared with conventional liquid crystal display devices.

SUMMARY OF THE INVENTION

The $1^{st}$ aspect of the present invention is a liquid crystal display device including gate wiring parts for supplying a scanning signal to switching elements formed in a matrix form in a display area, and source wiring parts for supplying a video signal to the switching elements, the liquid crystal display device comprising:

a plurality of inspection switching elements arranged in an area outside the display area, and connected to the gate wiring parts or the source wiring parts; and a wiring part for electrically and mutually connecting source electrodes of the inspection switching elements by high resistance elements.

The $2^{nd}$ aspect of the present invention is the liquid crystal display device according to the $1^{st}$ aspect of the present invention, wherein the high resistance element is made of a semiconductor material.

The $3^{rd}$ aspect of the present invention is the liquid crystal display device according to the $2^{nd}$ aspect of the present invention, wherein the semiconductor material is amorphous silicon.

The $4^{th}$ aspect of the present invention is the liquid crystal display device according to the $1^{st}$ aspect of the present invention, wherein the switching element is a thin-film transistor.

The $5^{th}$ aspect of the present invention is the liquid crystal display device according to the $4^{th}$ aspect of the present invention, further comprising a common wiring part for mutually connecting gate electrodes of the plurality of thin-film transistors, wherein in the common wiring part, a region having a resistivity higher than a resistivity of the other region of the common wiring part is provided between the gate electrodes.

The $6^{th}$ aspect of the present invention is the liquid crystal display device according to the $5^{th}$ aspect of the present invention, wherein the region having the higher resistivity is formed of ITO.

The $7^{th}$ aspect of the present invention is a liquid crystal display device including gate wiring parts for supplying a scanning signal to switching elements formed in a matrix form in a display area, and source wiring parts for supplying a video signal to the switching elements, the liquid crystal display device comprising:

a plurality of inspection switching elements arranged in an area outside the display area, and connected to the gate wiring parts or the source wiring parts; and a wiring part for electrically and mutually connecting drain electrodes of the inspection switching elements by high resistance elements.

The $8^{th}$ aspect of the present invention is the liquid crystal display device according to the $7^{th}$ aspect of the present invention, wherein the high resistance element is made of a semiconductor material.

The $9^{th}$ aspect of the present invention is the liquid crystal display device according to the $8^{th}$ aspect of the present invention, wherein the semiconductor material is amorphous silicon.

The $10^{th}$ aspect of the present invention is the liquid crystal display device according to the $7^{th}$ aspect of the present invention, wherein the switching element is a thin-film transistor.

The $11^{th}$ aspect of the present invention is the liquid crystal display device according to the $10^{th}$ aspect of the present invention, further comprising a common wiring part for mutually connecting gate electrodes of the plurality of thin-film transistors, wherein in the common wiring part, a region having a resistivity higher than a resistivity of the other region of the common wiring part is provided between the gate electrodes.

The $12^{th}$ aspect of the present invention is the liquid crystal display device according to the $11^{th}$ aspect of the present invention, wherein the region having the higher resistivity is formed of ITO.

The $13^{th}$ aspect of the present invention is a liquid crystal display device including gate wiring parts for supplying a scanning signal to switching elements formed in a matrix form in a display area, and source wiring parts for supplying a video signal to the switching elements, the liquid crystal display device comprising:

a plurality of inspection switching elements arranged in an area outside the display area, and connected to the gate wiring parts or the source wiring parts; and a wiring part for electrically and mutually connecting source electrodes of the inspection switching elements by high resistance elements, and for electrically and mutually connecting drain electrodes of the inspection switching elements by high resistance elements.

The $14^{th}$ aspect of the present invention is the liquid crystal display device according to the $13^{th}$ aspect of the present invention, wherein the high resistance element is made of a semiconductor material.

The $15^{th}$ aspect of the present invention is the liquid crystal display device according to the $14^{th}$ aspect of the present invention, wherein the semiconductor material is amorphous silicon.

The $16^{th}$ aspect of the present invention is the liquid crystal display device according to the $13^{th}$ aspect of the present invention, wherein the switching element is a thin-film transistor.

The $17^{th}$ aspect of the present invention is the liquid crystal display device according to the $16^{th}$ aspect of the present invention, further comprising a common wiring part for mutually connecting gate electrodes of the plurality of thin-film transistors, wherein in the common wiring part, a region having a resistivity higher than a resistivity of other region of the common wiring part is provided between the gate electrodes.

The $18^{th}$ aspect of the present invention is the liquid crystal display device according to the $17^{th}$ aspect of the present invention, wherein the region having the higher resistivity is formed of ITO.

According to the present invention, it is possible to provide a liquid crystal display device capable of reducing destruction of inspection switching elements or disconnection of wiring parts connected to the inspection switching elements, due to static electricity, as compared with conventional liquid crystal display devices.

Figure 1:
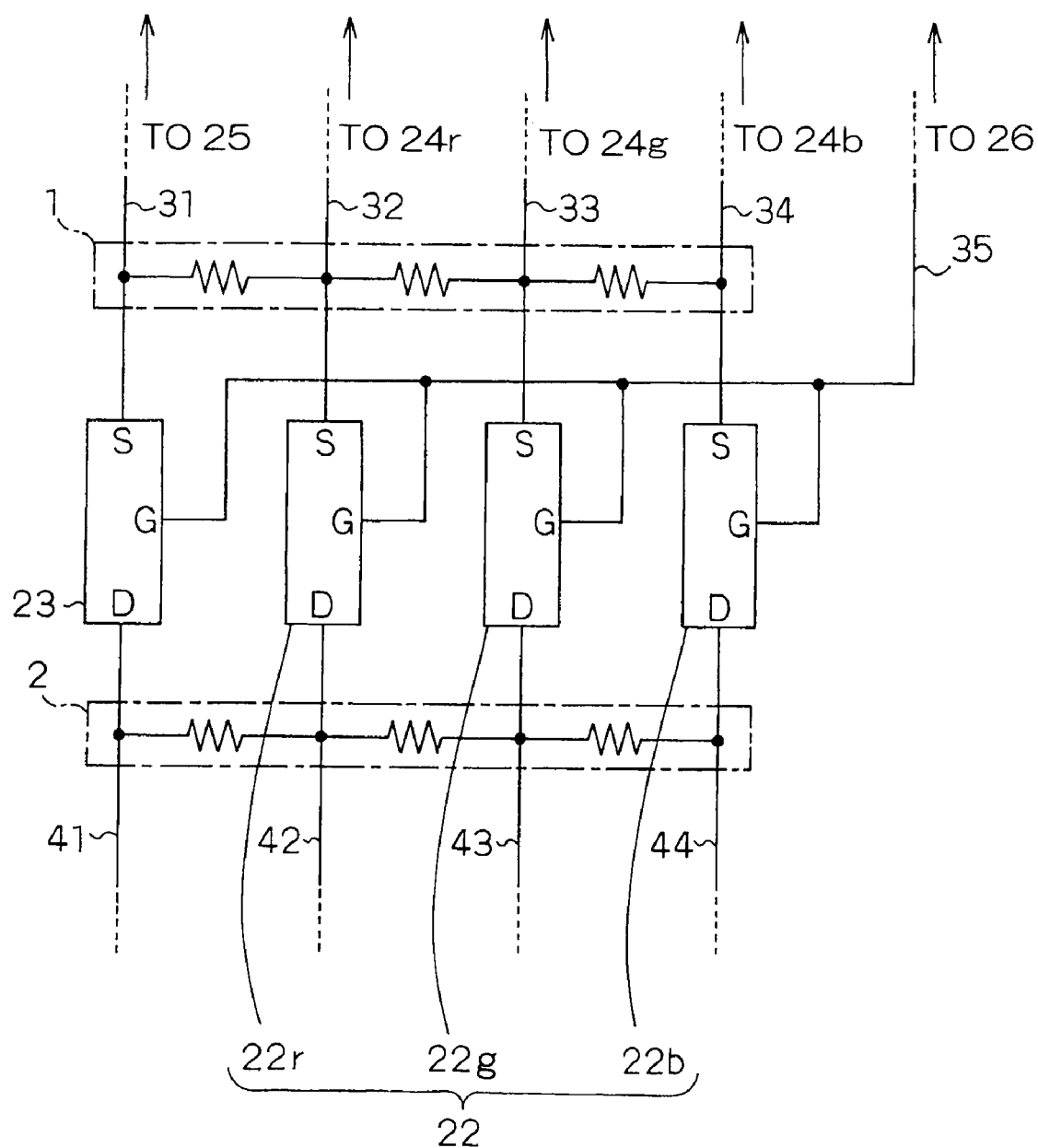
FIG. 1 is a top view schematically showing a part of a liquid crystal display device according to Embodiment 1 of the present invention.

DESCRIPTION OF SYMBOLS 1, 2 Semiconductor wiring group
1a, 1b, 1c Semiconductor wiring section
11a, 11b Gate wiring part
12a, 12b Source wiring part
21 Array substrate
22, 22r, 22g, 22b, 23 Inspection TFT
24, 24r, 24g, 24b, 25, 26 Inspection signal input pad
27, 27b, 27g, 27r Pixel
30 Display area
31, 32, 33, 34 Source wiring part
35, 36 Common wiring part
36a, 36b, 36c, 36d Metal wiring section 37a, 37b, 37c High resistance section
41, 42, 43, 44 Drain wiring part

PREFERRED EMBODIMENTS OF THE INVENTION

In the following, embodiments according to the present invention will be described with reference to the accompanying drawings.

Embodiment 1

FIG. 1 is a top view schematically showing, on a larger scale, a part of a liquid crystal display device according to Embodiment 1 of the present invention. FIG. 1 is an enlarged view of the portion corresponding to the region A in FIG. 4. In FIG. 1, the same components as those shown in FIG. 4 are denoted by the same reference numerals and characters, and the explanation thereof is omitted.

Figure 4:
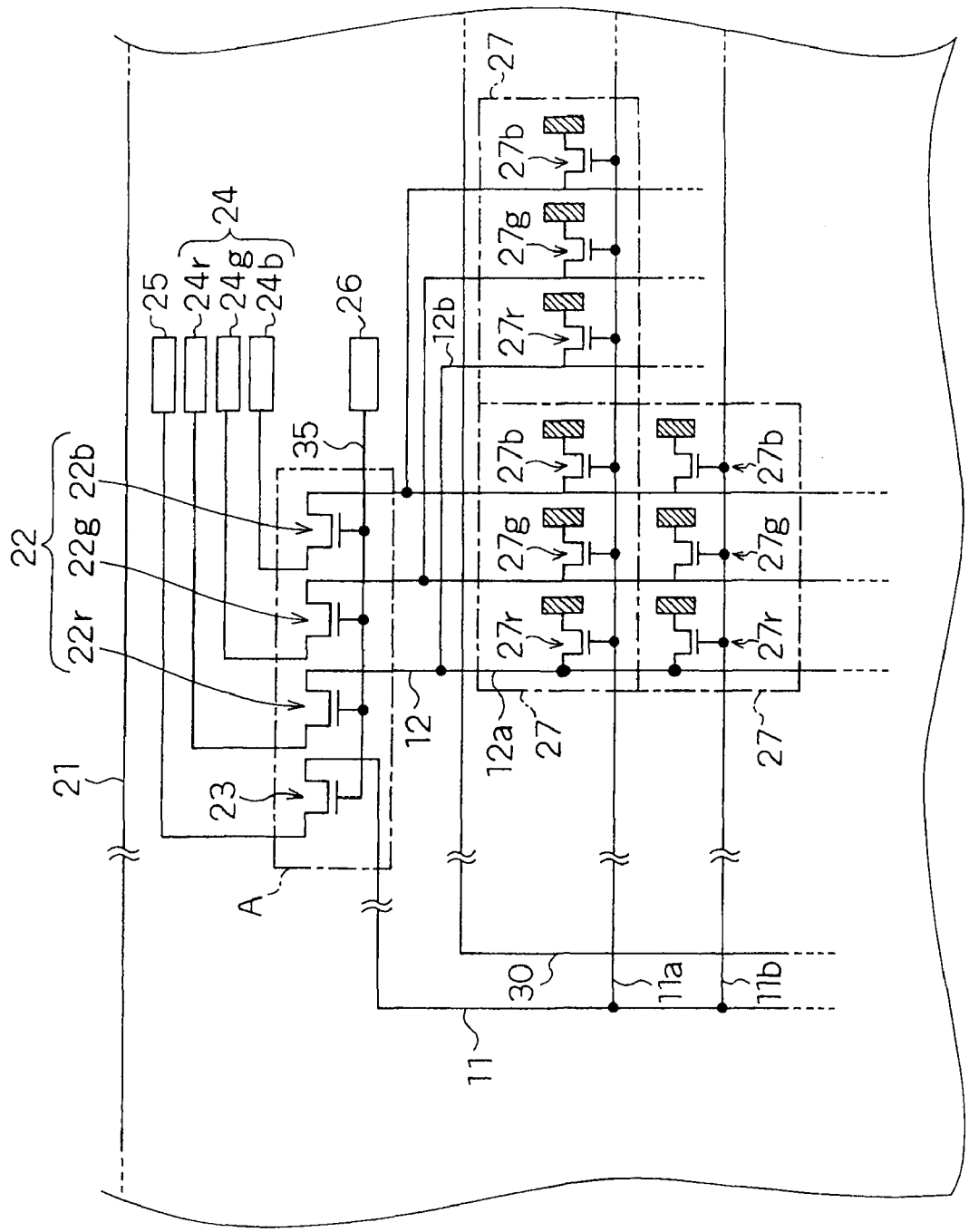
FIG. 4 is a figure schematically showing a part of a configuration of a conventional liquid crystal display device.

The liquid crystal display device according to the present embodiment includes components shown in FIG. 4, and a semiconductor wiring group 1 and a semiconductor wiring group 2 which are shown in FIG. 1.

The semiconductor wiring group 1 mutually connects source wiring parts 31 to 34 which are respectively connected to the source of inspection TFTs 22r, 22g, 22b and 23. The semiconductor wiring group 2 mutually connects drain wiring parts 41 to 44 which are respectively connected to the drain of the inspection TFTs 22r, 22g, 22b and 23. Note that the semiconductor wiring groups 1 and 2 shown in FIG. 1 are simplified and schematically illustrated. A detailed structure of the semiconductor wiring groups 1 and 2 will be described below.

The semiconductor wiring groups 1 and 2 are formed of a material having a resistivity higher than that of the source wiring parts 31 to 34 and the drain wiring parts 41 to 44, which are formed of a metallic material such as aluminum. For example, the semiconductor wiring groups 1 and 2 are formed of an amorphous silicon.

Next, the structure of the semiconductor wiring groups 1 and 2 will be described with reference to FIG. 2.

Figure 2:
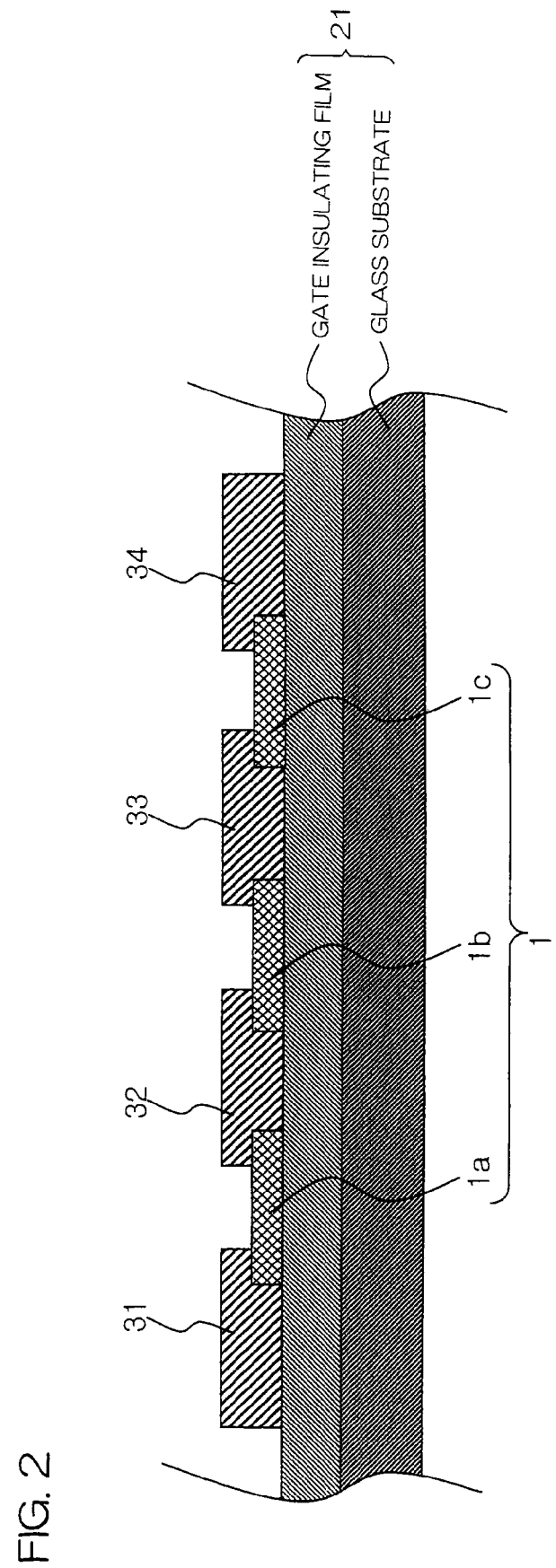
FIG. 2 is a sectional view of a semiconductor wiring group 1 of the liquid crystal display device according to Embodiment 1 of the present invention.

FIG. 2 is a sectional view of the semiconductor wiring group 1 of the liquid crystal display device according to Embodiment 1. In the following, the semiconductor wiring group 1 will be described as an example. As shown in FIG. 2, the semiconductor wiring section 1a mutually connects the source wiring parts 31 and 32 formed of aluminum or the like. Similarly, the semiconductor wiring section 1b mutually connects the source wiring parts 32 and 33, and the semiconductor wiring section 1c mutually connects the source wiring parts 33 and 34. As described above, the semiconductor wiring group 1 shown in FIG. 1 is illustrated in such a way as to cross the source wiring parts 31 to 34. However, as shown in FIG. 2, the semiconductor wiring group 1 is actually formed between the source wiring parts and the array substrate 21, and is configured by the semiconductor wiring sections 1a to 1c which mutually connect the adjacent source wiring parts.

Subsequently, there are described an operation and effect of the semiconductor wiring groups 1 and 2 of the liquid crystal display device according to the present embodiment.

First, the state where static electricity is not generated is described. As described above, the semiconductor wiring group 1 mutually connects the source wiring parts. For this reason, it is conceivable that the signal flowing through each of the source wiring parts 31 to 34 leaks into the adjacent wiring parts via the semiconductor wiring group 1. However, the semiconductor wiring group 1 is formed of a semiconductor material having a high resistivity. Thus, in the state where static electricity is not generated, the signal leakage is hardly caused. Further, even when the signal leakage into the semiconductor wiring group 1 is caused, the leaked signal is at a level which can be ignored, and hence the leaked signal does not affect the display quality of the liquid crystal display device.

Next, there is described, for example, a case where static electricity is generated in an array process or a conveying process of the array substrate. As described above, the inspection TFTs 22 and 23 also function as capacitance. Thus, when static electricity is generated, the static electricity flows into the inspection TFT 22 and/or the inspection TFT 23. However, since the voltage of the generated static electricity is high, for example, when the static electricity flows into the inspection TFT 23, the static electricity also flows into the source wiring part 32 adjacent to the source wiring part 31, and the like, via the semiconductor wiring group 1. As a result, the generated static electricity is also distributed into the adjacent source wiring parts. Therefore, it is possible to prevent the inspection TFTs 22 and 23, into which the static electricity flows, from being destructed by the static electricity, or to prevent disconnection of the wiring parts connected to the inspection TFTs 22 and 23. Note that here, the semiconductor wiring group 1 is described as an example, but the above description can also be applied to the semiconductor wiring group 2.

Next, a method for forming the semiconductor wiring groups 1 and 2 will be described. When the semiconductor wiring groups 1 and 2 are formed of an amorphous silicon, it is possible to form the semiconductor wiring group by using a process for forming an amorphous silicon layer in the conventional manufacturing process of thin-film transistors.

Note that the source wiring parts 31 to 34 are an example of the source wiring parts according to the present invention. The drain wiring parts 41 to 44 are an example of the drain wiring parts according to the present invention. The inspection TFTs 22 and 23 are an example of the inspection switching element according to the present invention. The semiconductor wiring groups 1, 2 are an example of the wiring part according to the present invention.

By mutually connecting the source wiring parts and the drain wiring parts of the inspection TFTs in this way, the static electricity generated by peeling charge or the like can be distributed into the surrounding source or drain wiring parts. This can prevent the high voltage static electricity from being concentrated on one place and thereby the inspection TFT from being destructed. Therefore, it is possible to surely perform the simultaneous lighting image inspection in the cell process, so that the reduction in the production efficiency of the liquid crystal display device can be suppressed.

Note that in the present embodiment, the semiconductor wiring group 1 is described as an example, but the above description can also be applied to the semiconductor wiring group 2.

Embodiment 2

Figure 3:
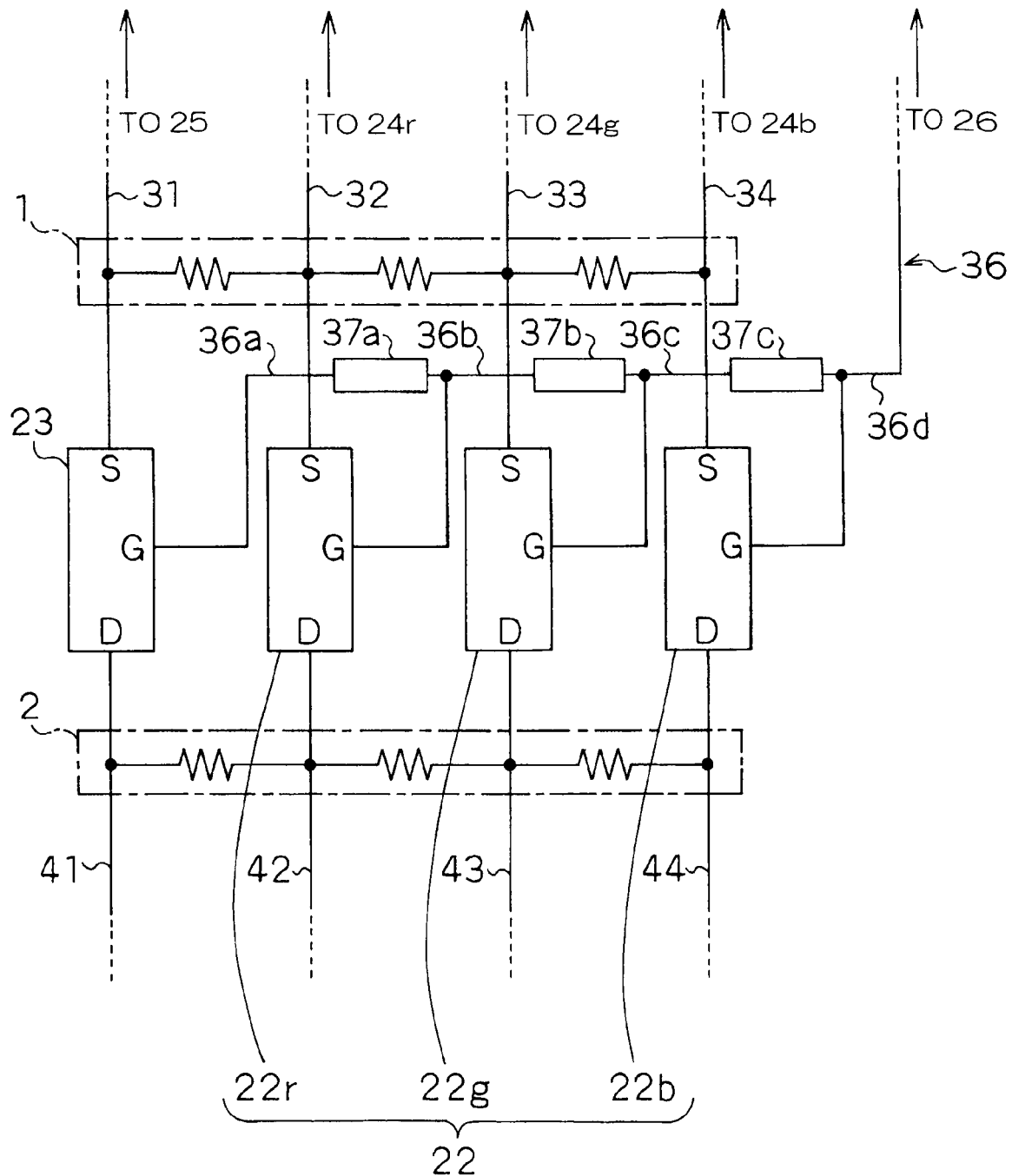
FIG. 3 is a top view schematically showing a part of a liquid crystal display device according to Embodiment 2 of the present invention.

FIG. 3 is a top view schematically showing, on a larger scale, a part of a liquid crystal display device according to Embodiment 2 of the present invention. FIG. 3 is an enlarged view of the portion corresponding to the region A in FIG. 4, and the same components as those shown in FIG. 1 are denoted by the same reference numerals and characters. In the following, the description about the same components as the semiconductor wiring groups 1 and 2, or the like, described with reference to FIG. 1 will be omitted, and common wiring part of the liquid crystal display device according to the present embodiment will be described in detail.

First, the influence of static electricity accumulated in the gate of the inspection TFT is described.

In the conventional liquid crystal display device, as shown in FIG. 4, each gate of the inspection TFTs 22 and 23 is connected to the inspection signal input pad 26 via the common wiring part 35 formed of a metallic material such as aluminum. Therefore, the gate of the inspection TFTs and the common wiring part 35 practically form one large capacitance. That is, a very large electric charge (static electricity) can be accumulated in the gate of the inspection TFTs and the common wiring part 35. As a result, the inspection TFT is more likely to be destroyed by the static electricity accumulated in the one large capacitance.

Next, a common wiring part of the liquid crystal display device according to the present embodiment will be described in detail.

As shown in FIG. 3, the configuration of the common wiring part 36 of the liquid crystal display device according to the present embodiment is different from the configuration of the common wiring part 35 (see FIG. 4) of the conventional liquid crystal display device. The common wiring part 36 of the liquid crystal display device according to the present embodiment is configured by metal wiring sections 36a to 36d formed by using a metallic material such as aluminum, and configured by high resistance sections 37a to 37c. The high resistance sections 37a to 37c, which are examples of the high resistivity region according to the present invention, are interposed between the gates of the inspection TFTs 22 and 23. Further, the metal wiring sections 36a to 36d form regions of the common wiring part 36 other than the regions in which the high resistance sections are formed.

For the metal wiring sections 36a to 36d, a metallic material such as aluminum is used similarly to the common wiring part 35 of the conventional liquid crystal display device. On the other hand, the high resistance sections 37a to 37c are formed of a material having a resistivity higher than that of the metal wiring sections 36a to 36d. For example, ITO (Indium Tin Oxide) or the like is used as the material of the high resistance sections 37a to 37c.

The interposition of the high resistance sections 37a to 37c in the common wiring part 36 makes it possible to reduce the electrostatic capacitance value of the one large capacitance formed by the gate of inspection TFTs 22 and 23. Since the amount of the static electricity accumulated in the one large capacitance can be suppressed, for example, even when static electricity is generated in the cell process after the array process, it is possible to suppress the risk of destruction of the inspection TFTs 22 and 23. Further, the interposition of the high resistance sections 37a to 37c in the common wiring part 36 makes it possible to suppress the peak value of the peak current at the time when static electricity is generated. As a result, even when the static electricity is generated, the maximum value of current (peak current) flowing into the inspection TFTs can be reduced as compared with the case using the common wiring part in which the high resistance sections are not interposed. Thus, it is possible to prevent the inspection TFTs from being destructed by the static electricity.

Next, a method for forming the common wiring part 36 will be described. First, a method for forming the metal wiring sections 36a to 36d is described. In a process for forming source electrodes and drain electrodes in the array process, the metal wiring sections 36a to 36d of the common wiring part 36 can be formed together with the source electrodes and the drain electrodes.

Further, when the high resistance sections 37a to 37c and pixel electrodes (not shown) are formed of the same material, the high resistance sections 37a to 37c can be formed together with the pixel electrodes in the process for forming the pixel electrodes in the array process. On the other hand, when the high resistance sections 37a to 37c are formed of a material different from the material forming the pixel electrodes, the process for forming the high resistance sections 37a to 37c needs to be added to the array process. In this way, the method in which the high resistance sections 37a to 37c are formed of the same material as that of the pixel electrodes is preferred because the common wiring part 36 can be formed without a large change of the array process from the conventional process.

In the array process, each gate of the inspection TFTs 22 and 23 forms individual capacitance until the high resistance sections 37a to 37c are formed. That is, before the high resistance sections 37a to 37c are formed, the metal wiring sections 36a to 36d are not electrically connected to each other. Thus, the each gate of the inspection TFTs 22 and 23 and the common wiring part 36 cannot form one large capacitance. As a result, even if static electricity is generated when the high resistance sections 37a to 37c are not yet formed, the amount of the static electricity flowing into the each gate of the inspection TFTs 22 and 23 is suppressed as compared with the case where static electricity is generated after the formation of one large capacitance. Therefore, it is possible to reduce the risk of destruction of the inspection TFT due to the static electricity generated in the array process.

In this way, the liquid crystal display device according to the present embodiment is capable of suppressing the risk of destruction of the inspection TFT due to the static electricity in the array process, and the risk of destruction of the inspection TFT due to the static electricity in the cell process, respectively. Therefore, the liquid crystal display device according to the present embodiment is capable of suppressing the risk of destruction of the inspection TFT due to the static electricity generated in the manufacturing process of the liquid crystal display device.

Note that in Embodiment 2, it is described that the liquid crystal display device is made capable of suppressing the risk of destruction of the inspection TFTs 22 and 23 due to the static electricity by forming the high resistance sections 37a to 37c and the semiconductor wiring groups 1 and 2, but only the high resistance sections 37a to 37c may be formed. In this case, the effect of distributing the static electricity generated in the cell process and the like after the array process, is reduced as compared with the case where the high resistance sections 37a to 37c and the semiconductor wiring groups 1 and 2 are combined.

Note that in the above described embodiment, the semiconductor wiring groups 1 and 2 are described as being provided for the source wiring parts 31 to 34 and the drain wiring parts 41 to 44, but the present invention is not limited to this. For example, only one of the semiconductor wiring groups 1 and 2 may be provided. In this case, the effect of distributing the static electricity is reduced as compared with the case where the semiconductor wiring groups 1 and 2 are formed.

Further, in the above described embodiment, the semiconductor wiring groups 1 and 2 are described as mutually connecting the wiring parts which are respectively connected to the source or drain of the inspection TFTs, but the present invention is not limited to this. For example, the semiconductor wiring groups 1 and 2 may also be configured to mutually connect the sources of inspection TFTs and to mutually connect the drains of inspection TFTs.

Further, in the above described embodiment, the thin-film transistor is described as an example of the inspection switching element according to the present invention, but the present invention is not limited to this. For example, field-effect transistors such as a thin-film transistor and an MOS transistor, or nonlinear elements such as a diode, can be used as the inspection switching element.

The liquid crystal display device according to the present invention is capable of reducing destruction of the inspection switching elements due to the static electricity or disconnection of wiring parts connected to the inspection switching elements as compared with conventional liquid crystal display devices, and is useful as an active matrix type liquid crystal display device or the like.

What is claimed is:

1. A liquid crystal display device including,
    gate wiring parts for supplying a scanning signal to switching elements formed in a matrix form in a display area, and
    source wiring parts for supplying a video signal to the switching elements, the liquid crystal display device comprising:
    a plurality of inspection switching elements comprising thin-film transistors arranged in an area outside the display area, and connected to the gate wiring parts or the source wiring parts;
    a wiring part for electrically and mutually connecting source electrodes of the thin-film transistors by high resistance elements; and
    a common wiring part for mutually connecting gate electrodes of the thin-film transistors,
    wherein in the common wiring part, a region having a resistivity higher than a resistivity of the other region of the common wiring part is provided between the gate electrodes.

2. The liquid crystal display device according to claim 1, wherein the region having the higher resistivity is formed of ITO.

3. A liquid crystal display device including,
    gate wiring parts for supplying a scanning signal to switching elements formed in a matrix form in a display area, and
    source wiring parts for supplying a video signal to the switching elements, the liquid crystal display device comprising:
    a plurality of inspection switching elements comprising thin-film transistors arranged in an area outside the display area, and connected to the gate wiring parts or the source wiring parts;
    a wiring part for electrically and mutually connecting source electrodes of the thin-film transistors by high resistance elements, and for electrically and mutually connecting drain electrodes of the thin-film transistors by high resistance elements; and
    a common wiring part for mutually connecting gate electrodes of the thin-film transistors,
    wherein in the common wiring part, a region having a resistivity higher than a resistivity of other region of the common wiring part is provided between the gate electrodes.

4. The liquid crystal display device according to claim 3, wherein the region having the higher resistivity is formed of ITO.

* * * * *